Figure 1:
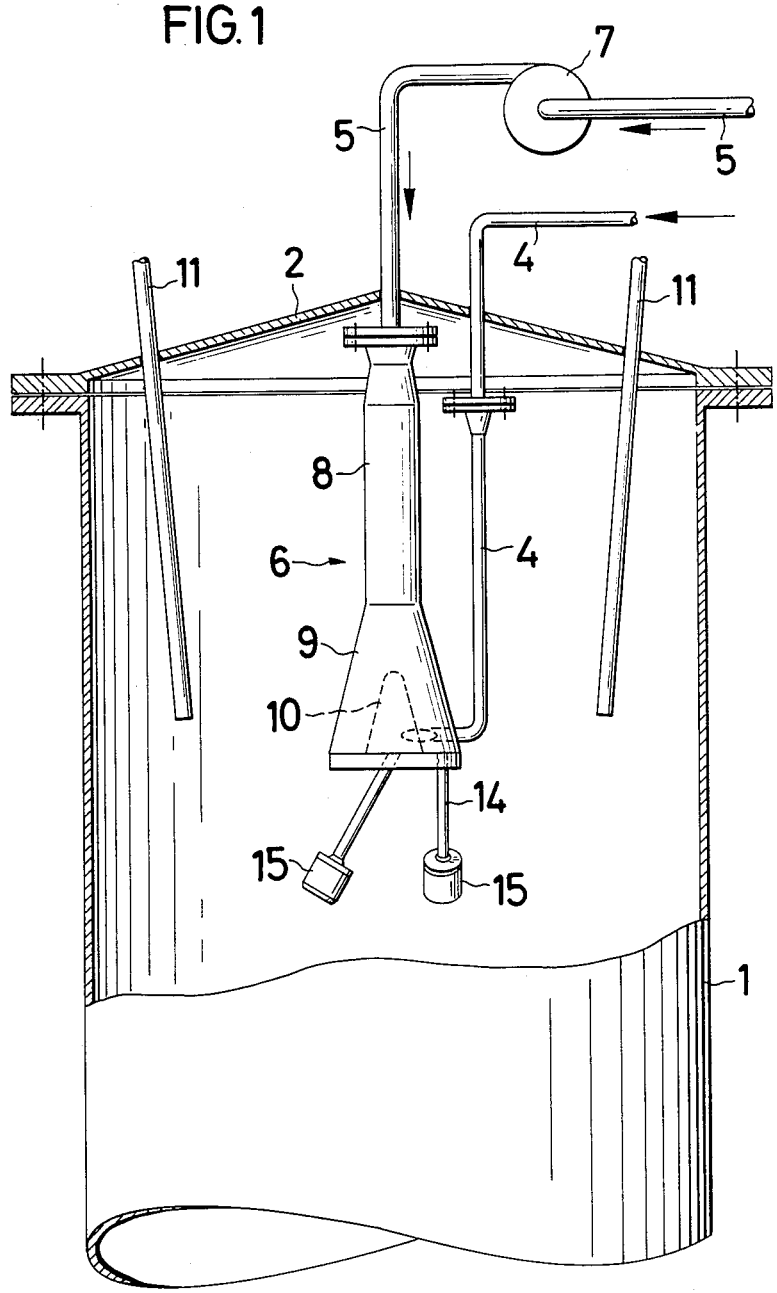

__United States Patent__ [19]

Kowalski et al.

[11] Patent Number: 4,721,608

[45] Date of Patent: * Jan. 26, 1988

[54] SPHEROIDAL ALKALI METAL POLYPHOSPHATES OF LOW APPARENT DENSITY, AND PROCESS FOR MAKING THEM

[75] Inventors: Werner Kowalski, Weilerswist; Hans Haas, Swisttal; Theo Dahmen, Brühl; Markus Erpenbach, Cologne, all of Fed. Rep. of Germany

[73] Assignee: Hoechst AG, Fed. Rep. of Germany

[*] Notice: The portion of the term of this patent subsequent to Jan. 5, 2005 has been disclaimed.

[21] Appl. No.: 847,485

[22] Filed: Apr. 3, 1986

[30] Foreign Application Priority Data

Apr. 17, 1985 [DE] Fed. Rep. of Germany ....... 3513743

[51] Int. Cl.$^4$ .................... C01B 15/16; C01B 25/26
[52] U.S. Cl. .................................... 423/315; 423/305
[58] Field of Search ............... 423/305, 315, 307, 308, 423/309, 311, 312

[56] References Cited

U.S. PATENT DOCUMENTS

| | | | |
|---|---|---|---|
| 3,449,068 | 6/1969 | Hartlapp et al. | 423/315 |
| 4,391,783 | 7/1983 | Hass et al. | 423/315 |
| 4,501,639 | 2/1985 | Damman et al. | 423/305 X |
| 4,534,946 | 8/1985 | Damman et al. | 423/315 |
| 4,556,525 | 12/1985 | Berglund | 423/315 X |

Primary Examiner—Gregory A. Heller
Attorney, Agent, or Firm—Connolly and Hutz

[57] ABSTRACT

Alkali metal polyphosphates consisting substantially of hollow spheroidal particles with an apparent density of less than 350 g/l are made. To this end, an alkali metal orthophosphate solution is forced under a pressure of 6–40 bars into a fluidization zone; the orthophosphate solution is fluidized in the fluidization zone by injecting a finely dispersed permanent gas maintained under a pressure higher than the orthophosphate solution; and the fluidized orthophosphate solution is sprayed with the aid of a plurality of single medium nozzles arranged downstream of the fluidization zone through a flame zone peoduced inside the spray tower. Apparatus for carrying out the process.

3 Claims, 3 Drawing Figures

SPHEROIDAL ALKALI METAL POLYPHOSPHATES OF LOW APPARENT DENSITY, AND PROCESS FOR MAKING THEM

The present invention relates to alkali metal polyphosphates of low apparent density, to a process for making them by spraying an alkali metal orthophosphate solution under a pressure of 6–40 bars with the use of a plurality of single medium nozzles through a flame zone produced in a spray tower, and to an apparatus for carrying out the process.

U.S. Pat. No. 4,501,639 discloses a process for making alkali metal polyphosphates from an alkali metal phosphate solution or suspension by spraying it under a pressure of 6–66 bars through a flame zone produced in a spray tower using a plurality of single medium nozzles. The alkali metal polyphosphates so made have an apparent density of between 620 and 720 g/l.

Alkali metal polyphosphates of low apparent density are generally made by spraying an alkali metal phosphate solution together with an inflating agent, i.e. a substance liberating a gas phase under the spray conditions and thus favoring the formation of hollow spheroids. Substances of this kind are, for example, alkali metal salts of phosphoric acids wherein phosphorus has an electropositive valence of less than 5 (cf. U.S. Pat. No. 2,986,449) and alkali metal carbonate or bicarbonate solutions (cf. U.S. Pat. No. 3,378,341) and urea. In this way, alkali metal polyphosphates with an apparent density of 400 to 450 g/l are obtained.

The qualification of alkali metal tripolyphosphates for use in detergent compositions is critically determined by their contents of $Me^I{}_5P_3O_{10}$ and high and low temperature modifications. A further property to consider for the use of alkali metal tripolyphosphates in the production of detergent compositions is the apparent density; it is a practical dimension for their surface and also of significant importance to the filling level in the packagings customarily used for selling pulverulent detergent compositions.

It is therefore an object of the present invention to provide alkali metal polyphosphates with an apparent density of less than 400 g/l, a process for making them and an apparatus for carrying out the process. The alkali metal polyphosphates made in accordance with this invention consist substantially of hollow spheroidal particles and have an apparent density of less than 350 g/l, preferably 200–300 g/l.

The process for making the present alkali metal polyphosphates comprises: forming an alkali metal orthophosphate solution under a pressure of 6–40 bars into a fluidization zone; fluidizing the orthophosphate solution in the fluidization zone by injecting a finely dispersed permanent gas maintained under a pressure higher than the orthophosphate solution; and spraying the fluidized orthophosphate solution with the aid of a plurality of single medium nozzles arranged downstream of the fluidization zone through a flame zone produced inside the spray tower.

Further preferred and optional features of the present process provide:

(a) for the permanent gas to be compressed air;
(b) for the permanent gas to be carbon dioxide;
(c) for the permanent gas to be nitrogen;
(d) for the permanent gas to be maintained under a pressure at least 20% higher than that selected for the alkali metal phosphate solution;
(e) for 1.5–40 normal m$^3$; preferably 2–6 normal m$^3$ (S.T.P.) permanent gas to be used per m$^3$ alkali metal phosphate solution.

The apparatus for carrying out the present process comprises a cylindrical spray tower closed by a cover having a solution inlet centrally passed through it, terminating in a spray means; a plurality of burners opening through the cover into the tower; the spray means being a tubular solution inlet having a conical structural element secured to one of its ends and the latter having centrally installed in it a conical displacer, the walls of the conical element and displacer forming the boundary lines of a fluidization zone; the conical structural element being closed downwardly by a circular plate provided with a plurality of inlets opening with their upper ends into the fluidization zone and terminating with their lower ends in a plurality of individual single medium nozzles in bundled arrangement; and a compressed gas inlet opening tangentially into the fluidization zone.

Further preferred and optional features of the present apparatus provide:

(f) for each of the individual single medium nozzles to be provided with 5–9, preferably 7, bores;
(g) for each bore to have a diameter 0.5–4 mm wide;
(h) for the bundle of nozzles to comprise 6–14 single medium nozzles;
(i) for the compressed gas inlet to have a diameter 0.3–4 mm wide.

In the process of this invention, the permanent gas injected into the fluidization zone causes a foamy gas/liquid-mixture to issue from the nozzle outlets, which is directly sprayed into the flame zone inside the spray tower whereby it becomes converted, with evaporation of water, to alkali metal polyphosphates having an apparent density of less than 350 g/l.

The process of this invention permits the apparent density of the final product to be acted upon just by varying the quantity of permanent gas admitted, the final product being the lighter in weight the higher the quantity of gas used per m$^3$ alkali metal phosphate solution, the diameter of the bores in the single medium nozzles and the pressure selected for the alkali metal phosphate solution remaining unchanged.

In the apparatus used for carrying out the present invention, the single medium nozzles in bundle arrangement should preferably be arranged in annular fashion.

Figure 2:
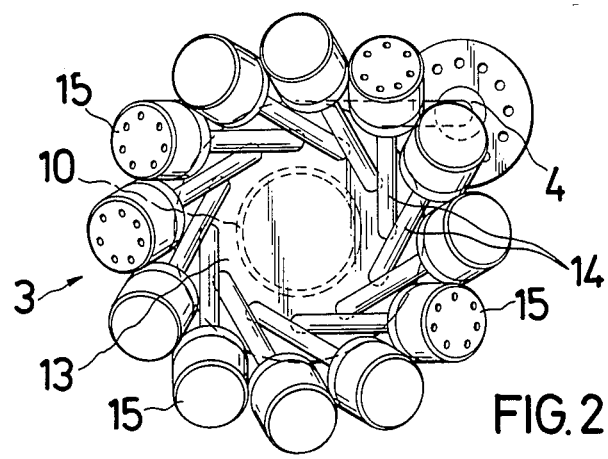
Figure 3:
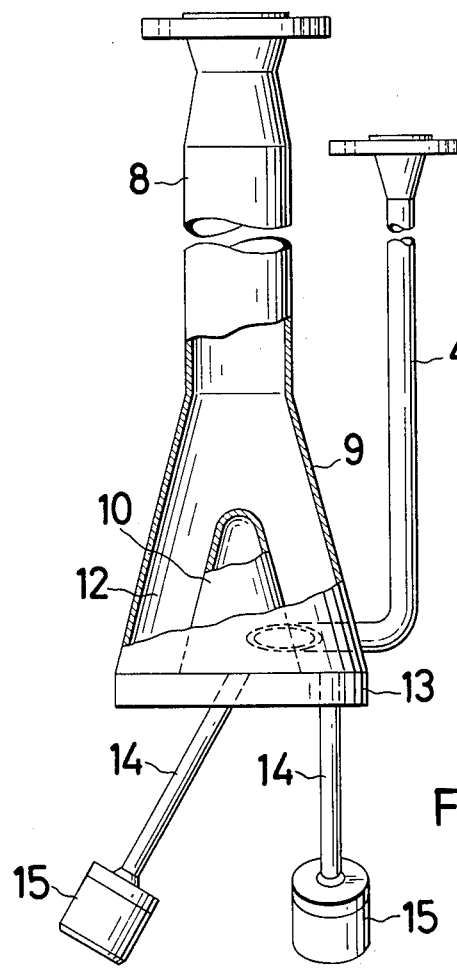

An apparatus for carrying out the present process is illustrated diagrammatically and partially in section in the accompanying drawings of which:

FIG. 1 represents a partial lateral vue of a spray tower;
FIG. 2 represents a spray means seen from below;
FIG. 3 represents a lateral view of a spray means.

With reference to the drawings:

A cylindrical spray tower 1 is closed by means of a conical cover 2. A solution inlet 5 coming from outside spray tower 1 opens centrally through cover 2 into spray tower 1, and terminates in a spray means 6. The solution inlet 5 outside spray tower 1 is fitted with at least one pressure-increasing pump 7. The cover 2 also has a plurality of burners 11 passed through it.

The spray means 6 comprises a solution inlet 8 having a conical structural element 9 secured to one of its ends. A conically designed displacer 10 is disposed centrally in the lower portion of structural element 9, the walls of the displacer 10 and structural element 9 forming the boundary lines of a fluidization zone 12. The conical structural element 9 is closed downwardly by a circular plate 13 provided with a plurality of inlets 14 opening with their upper ends into fluidization zone 12 and terminating with their opposite lower ends in plurality of single medium nozzles 15 in bundled arrangement 3. A compressed gas inlet 4 opens tangentially into fluidization zone 12.

EXAMPLE 1

(Prior Art)

9 m$^3$/h sodium orthophosphate solution containing 30 wgt % P$_2$O$_5$ and Na:P in a ratio of 1.666:1 (5:3) was sprayed under a pressure of 16 bars inside a spray tower with the aid of a bundle of nozzles comprised of 12 individual single medium nozzles of which each was provided with 7 bores 1.8 mm in diameter (cf. FIGS. 1 through 3), the compressed gas inlet being closed. The spray tower was heated by burning carbon monoxide.

7.5 t/h product containing 98.1% Na$_5$P$_3$O$_{10}$ with an apparent density of 650 g/l was obtained.

EXAMPLE 2

(Prior Art)

Example 1 was repeated with that modification however that 5 kg urea (corresponding to 1.25 wgt %, based on P$_2$O$_5$), was added per m$^3$ sodium orthophosphate solution. 7.5 t/h product containing 98.0% Na$_5$P$_3$O$_{10}$ with an apparent density of 450 g/l was obtained.

EXAMPLE 3

(Invention)

Example 1 was repeated with that modification however that 20 normal m$^3$/h (S.T.P.) compressed air was injected under a pressure of 20 bars into the fluidization zone through the compressed gas inlet 1 mm in diameter.

7.5 t/h product consisting substantially of hollow spheroidal particles (beads), containing 98.1 Na$_5$P$_3$O$_{10}$ with an apparent density of 340 g/l was obtained.

EXAMPLE 4

(Invention)

Example 3 was repeated with that modification that 38 normal m$^3$ (S.T.P.) compressed air was used.

7.5 t/h product consisting substantially of hollow spheroidal particles (beads), containing 98.1 Na$_5$P$_3$O$_{10}$ with an apparent density of 280 g/l was obtained.

EXAMPLE 5

(Invention)

9 m$^3$/h sodium orthophosphate solution the same as that used in Example 1 was sprayed under a pressure of 10 bars inside the spray tower of Example 1 with the aid of a bundle of nozzles comprised of 6 individual single medium nozzles of which each was provided with 7 bores 2.8 mm in diameter. At the same time, 38 normal m$^3$ (S.T.P.) compressed air maintained under a pressure of 20 bars was injected into the fluidization zone through the compressed air inlet 1 mm in diameter. The spray tower was heated as described in Example 1.

7.5 t/h product consisting substantially of hollow spheroidal particles (beads), containing 98.0% Na$_5$P$_3$O$_{10}$ with an apparent density of 250 g/l was obtained.

EXAMPLE 6

(Invention)

Example 5 was repeated with that modification however that the compressed air was replaced by nitrogen as the permanent gas which was injected into the fluidization zone under a pressure of 22 bars.

7.5 t/h product consisting substantially of hollow spheroidal particles (beads) containing 98.0% Na$_5$P$_3$O$_{10}$ with an apparent density of 238 g/l was obtained.

EXAMPLE 7

(Invention)

Example 5 was replaced with that modification however that the compressed gas was replaced by carbon dioxide as the permanent gas which was injected into the fluidization zone under a pressure of 18 bars.

7.5 t/h product consisting substantially of hollow spheroidal particles (beads) containing 98.1% Na$_5$P$_3$O$_{10}$ with an apparent density of 248 g/l was obtained.

We claim:

1. A process for making hollow spheroidal alkali metal polyphosphates in a spray tower which comprises: forcing an alkali metal orthophosphate solution under a pressure of 6 to 40 bars into a fluidization zone arranged inside the spray tower and flow-connected to a plurality of single medium spray nozzles, injecting a finely dispersed permanent gas selected from the group consisting of compressed air, carbon dioxide, nitrogen and mixtures thereof into the fluidization zone, maintaining the finely dispersed permanent gas under a pressure at least 20% higher than that selected for the solution, and spraying the solution containing the finely disperesed permanent gas via the plurality of single medium nozzles through a flame zone produced inside the spray tower with the resultant formation of alkali metal polyphosphates having a bulk density of 200 to 320 g/l and an alkali metal polyphosphate content of at least 98%.

2. The process as claimed in claim 1, wherein 1.5–40 normal m$^3$ permanent gas is used per m$^3$ alkali metal phosphate solution.

3. The process as claimed in claim 2, wherein 2–6 normal m$^3$ (S.T.P.) permanent gas is used per m$^3$ alkali metal phosphate solution.

* * * * *